US010446009B2

(12) United States Patent
Bourne, Jr. et al.

(10) Patent No.: US 10,446,009 B2
(45) Date of Patent: Oct. 15, 2019

(54) CONTEXTUAL NOTIFICATION ENGINE

(71) Applicant: MICROSOFT TECHNOLOGY LICENSING, LLC, Redmond, WA (US)

(72) Inventors: Joseph Sprott Bourne, Jr., Bothell, WA (US); Roman Schindlauer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 15/050,031

(22) Filed: Feb. 22, 2016

(65) Prior Publication Data

US 2017/0243465 A1  Aug. 24, 2017

(51) Int. Cl.
| | | |
|---|---|---|
| *G06F 15/16* | (2006.01) | |
| *G08B 21/24* | (2006.01) | |
| *H04L 12/58* | (2006.01) | |
| *G06Q 10/06* | (2012.01) | |

(52) U.S. Cl.
CPC ....... *G08B 21/24* (2013.01); *G06Q 10/06314* (2013.01); *H04L 51/24* (2013.01)

(58) Field of Classification Search
CPC ................ G08B 21/24; H04L 51/24
See application file for complete search history.

(56) References Cited

U.S. PATENT DOCUMENTS

| | | | | |
|---|---|---|---|---|
| 7,243,130 | B2 * | 7/2007 | Horvitz ................ | G05B 19/404 709/206 |
| 7,257,200 | B2 * | 8/2007 | Valeriano ................ | H04L 41/06 379/88.12 |
| 8,934,877 | B2 * | 1/2015 | Toksvig ................. | H04W 4/90 455/414.1 |
| 2006/0240803 | A1 * | 10/2006 | Valeriano ................ | H04L 41/06 455/412.1 |
| 2009/0249391 | A1 | 10/2009 | Klein et al. | |
| 2010/0283601 | A1 * | 11/2010 | Tai ........................ | G06Q 50/24 340/539.12 |
| 2011/0298614 | A1 | 12/2011 | Bells | |
| 2012/0278104 | A1 * | 11/2012 | Traughber ............. | G08B 5/222 705/3 |

(Continued)

OTHER PUBLICATIONS

"International Search Report and Written Opinion Issued in PCT Application No. PCT/US2017/017903", dated Apr. 6, 2017, 12 Pages.

(Continued)

*Primary Examiner* — Moustafa M Meky
*Assistant Examiner* — Thorne E Waugh
(74) *Attorney, Agent, or Firm* — Shook, Hardy & Bacon LLP

(57) ABSTRACT

Aspects of the technology described herein are directed towards providing a timely notification to a user regarding an event. Computing devices have limited interface availability to provide notifications to a user. Aspects of the technology can make optimal use of the limited interfaces by allocating the limited resources to the most urgent and impactful notifications. The event can be assigned an impact level and an urgency level. The combination of the impact level and urgency level can be used to select a communication channel with an appropriate level of resource usage.

20 Claims, 6 Drawing Sheets

(56) References Cited

U.S. PATENT DOCUMENTS

| | | | | |
|---|---|---|---|---|
| 2014/0244765 | A1* | 8/2014 | Smith | H04L 51/24 |
| | | | | 709/206 |
| 2014/0253319 | A1* | 9/2014 | Chang | H04M 1/72522 |
| | | | | 340/521 |
| 2014/0282003 | A1* | 9/2014 | Gruber | G06F 3/165 |
| | | | | 715/727 |
| 2015/0074558 | A1 | 3/2015 | Haskins et al. | |
| 2015/0350148 | A1* | 12/2015 | Kenney | H04L 51/24 |
| | | | | 709/206 |
| 2016/0246378 | A1* | 8/2016 | Sampanes | G06F 3/016 |
| 2016/0248865 | A1* | 8/2016 | Dotan-Cohen | H04L 67/26 |
| 2017/0164167 | A1* | 6/2017 | Li | H04W 4/12 |
| 2017/0201481 | A1* | 7/2017 | Bisarya | H04L 51/26 |

OTHER PUBLICATIONS

Farber, Georg, "Prozessrechentechnik", In Proceedings of the Prozessrechentechnik—Springer-Verlag, Jan. 1, 1992, pp. 143-150.

* cited by examiner

CONTEXTUAL NOTIFICATION ENGINE

BACKGROUND

A personal assistant program provides services traditionally provided by a human assistant. For example, a personal assistant can update a calendar, provide reminders, track activities, and perform other functions. Some personal assistant programs can respond to voice commands and audibly communicate with users. Personal assistants can suggest restaurants, music, tasks, movies, and other items to a user when the user might have an interest in one of these items. Personal assistants have many different channels to communicate with a user. In addition, to the personal assistant, many other applications on a device may be attempting to communicate with the user through the available channels. Selecting a communication channel appropriate for the level of urgency associated with a communication (e.g., a notification) can be a challenge.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed towards systems, methods, and computer storage media for, among other things, selecting a communication channel for an event notification based on an urgency of the event and the potential impact of missing the event. Computing devices have limited interface availability to provide notifications to a user. Aspects of the technology can make optimal use of the limited interfaces by allocating the limited resources to the most urgent and impactful notifications. The event can be assigned an impact level and an urgency level.

The impact and urgency level can be mapped to a communication channel with an appropriate intrusiveness level for the notification. For example, the high intrusiveness level notifications may use an audible channel, or vibration channel if audio is muted, that sounds an alarm that does not stop until the user responds by selecting a button on a full screen interface that communicates the notification content. In this example, the combination of the audio channel and the full screen channel comprise the communication channel. On the other end of the spectrum, the least notifications assigned a low-intrusiveness level could be added to a list that the user needs to proactively navigate to for access to the notification. This is a low level of intrusiveness.

The technology described herein can also provide a mechanism for multiple applications to communicate a level of urgency to the user in a uniform way, even though the context of the various notifications is very different. In one example, a personal assistant application acts as a centralized notification hub through which notifications from multiple applications are delivered to the user. The personal assistant application can assign an impact and urgency to the notification/event and select a communication channel appropriate for the urgency and impact. Alternatively, the impact and urgency can be assigned by the application and used by the personal assistant application to select the appropriate communication channel.

BRIEF DESCRIPTION OF THE DRAWINGS

Aspects of the technology described in the present application are described in detail below with reference to the attached drawing figures, wherein.

DETAILED DESCRIPTION

Figure 1:
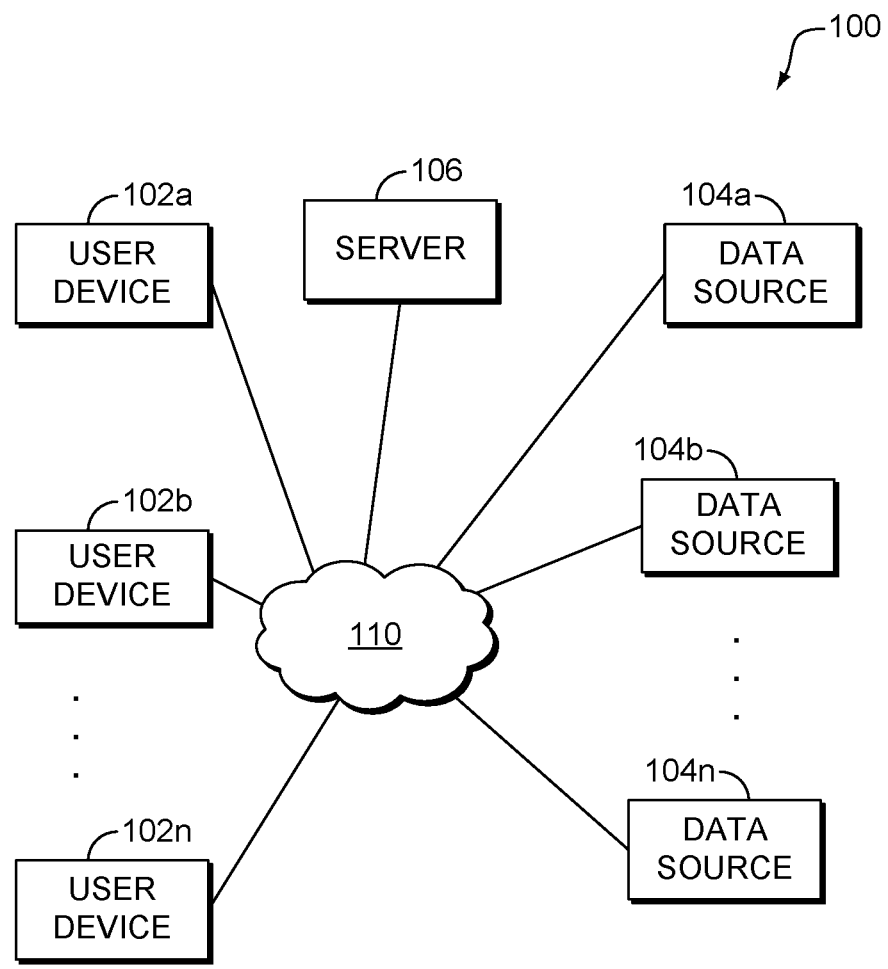
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, selecting a communication channel for an event notification based on an urgency of the event and the potential impact of missing the event. Computing devices have limited interface availability to provide notifications to a user. Aspects of the technology can make optimal use of the limited interfaces by allocating the limited resources to the most urgent and impactful events. The event can be assigned an impact level and an urgency level. The combination of the impact level and urgency level can be used to select a communication channel with an appropriate level of resource usage.

As used herein, the terms impact and impact level can be used interchangeable. Similarly, urgency and urgency level can be used interchangeable. Further, a notification may be described as having an urgency or impact. In all cases, the urgency or impact assigned to a notification is determined based on the event described in the notification.

For example, the most important notifications (high urgency and high impact) may use an audible channel, or vibration channel if audio is muted, that sounds an alarm that does not stop until the user responds by selecting a button on a full screen interface that communicates the notification content. In this example, the combination of the audio channel and the full screen channel comprise the communication channel. On the other end of the spectrum, the least important notifications (low urgency and low impact) could be added to a list that the user needs to proactively navigate to for access to the notification.

Aspects of the technology described herein can assign an urgency level and an impact level to any given event. The combination of the impact level and the urgency level can be used to select a communication channel with an appropriate intrusiveness level. In one aspect, the various communication channels on a given device may be assigned an intrusiveness level. In one aspect, the intrusiveness levels assigned to a communication channel is either high, medium, or low.

The technology described herein can act as a notification engine for notifications generated across multiple applications running on a device and/or across multiple subject matter domains used by a single application that generates notifications. In order to provide a uniform experience, a provider of a notification can include both an impact level and an urgency level when providing a notification request to a notification engine. The notification engine can also calculate an urgency level and an impact level based on known contextual information including information provided by another application or domain. The notification engine can include an application program interface designed to receive notification content along with an impact level and an urgency level. In addition, or alternatively, the application program interface can include fields to provide data that can be used to calculate or confirm an impact level and an urgency level. In an alternative, the notification engine uses contextual information to determine an impact and urgency for a notification associated with a request to present a notification.

The applications or notification domains generating the request to provide a notification do not need to be aware of the communication channels available on a particular computing device. The notification engine can generate the notification on an appropriate communication channel that is mapped to the urgency and impact. In addition, the notification engine can determine an impact when only an urgency is provided or determine an urgency when only an impact is provided by an application requesting a notification.

Communication Channel: As used herein a communication channel can comprises one or more output mechanisms available in a computing device. Output mechanisms include a speaker, a screen, a light, and haptic feedback mechanisms, such as a vibration mechanism. For example, a communication channel could comprise the combination of an audible sound emitted from a speaker and a visible notification displayed through a screen.

High-Intrusiveness level communication channel: A communication channel assigned a high level of intrusiveness requires a user interaction to disable the notification and no proactivity on the part of the user to find the notification. Different combinations of output mechanisms can be used to form a high-intrusiveness level communication channel.

When multiple high-intrusiveness level channels are available, a specific channel can be selected according to the context of the device. For example, if the device context indicates that a user is viewing a display screen and interacting with it then a visual notification presented on the top z-layer of the interface and requiring a physical interaction to dismiss may be selected as the high-intrusiveness level communication channel. On the other hand, if the device context indicates no present user interactions then an audible notification may be provided in combination with visual indications to draw the user's attention to the device.

In one aspect, a high-Intrusiveness level communication channel is selected for a notification related to an urgent event with high impact.

Medium-Intrusiveness level communication channel: A communication channel assigned a medium level of intrusiveness does not require user proactivity to find the notification, but does not require a user interaction to dismiss the notification.

In one aspect, medium-intrusiveness level communication channel is selected for a notification related to an event with high urgency and medium impact or an event with low urgency and high impact.

Low-Intrusiveness level communication channel: A communication channel assigned a low level of intrusiveness requires user proactivity to find the notification and also does not require a user interaction to disable or dismiss the notification. While a user interaction to disable the notification is not required for low or medium level communication channels, the notifications can include a dismiss interface. For example, a list of low level notifications could include a delete function to have the reminder removed from the list.

In one aspect, a low-Intrusiveness level communication channel is selected for a notification with a low urgency and low impact.

The intrusiveness of the reminder can change over time. For example, a bill pay reminder may initially be added to a passive list associated with a low-intrusiveness level. As the payment date approaches without the bill being paid, the urgency and impact of the bill-pay event can increase, causing the intrusiveness of the notification associated with the reminder to increase. If a late fee would be incurred if the bill is not paid today, then the impact would be high because failure to complete the task will cost money and the task would also be urgent because it is due within a day.

Urgency Level: In order to select an appropriate communication channel having an appropriate intrusiveness level for an event, the urgency and impact level of the event can be determined. The urgency level is tied to a timeframe for completing the event associated with the notification. The less time a user has to complete the event the higher the urgency level. In one aspect, events are classified as urgent or non-urgent. Urgent events are those with an event deadline within a threshold period of time from the present. The "present" as used herein, is a point in time in which a notification is to be presented. The threshold period of time can vary based on an event domain. In one aspect, events are classified into a domain and then a threshold period of time associated with the event domain is retrieved to determine urgency in combination with the event deadline. Exemplary threshold periods of time can include minutes, hours, or during the same day in which the notification is presented.

Impact Level: The impact associated with an event can be classified as high, medium, or low. A high impact event is one where not completing the event causes the user a loss of time and/or money. For example, failing to pay a bill on time could cause a loss of money when a late fee is then incurred. Missing an airplane flight can cause a significant loss in time and possibly money. The loss of time may be measured against a baseline behavior pattern for the user. The loss of time would occur as measured against the user's baseline behavior pattern. For example, if a user typically takes a train to work the loss of time caused by missing a first train could be measured by how long the user has to wait for the next train. When missing a train, the user could deviate from their typical behavior pattern and take a cab to work, which may or may not cause a loss of time. Nevertheless, the loss of time could be determined using the assumption that the user is going to continue with their typical behavior pattern (e.g., riding the train).

A medium impact level is assigned when the event is an optimization of a user's baseline behavior pattern that could save time or money, but missing the event will not cause a loss of time or money when compared to the user's baseline. In other words, the event improves the user's efficiency over the baseline. For example, suggesting a new route home when the baseline route followed by the user indicates a delay. In this example, the notification would give the user the option of changing baseline behavior. An event reminder for the user to pick up milk on the way home is another efficiency event.

A low impact level is assigned when the event or responding to the event is optional. For example, a notification indicating a favorite TV show is about to start or that certain communications (e.g., text, email) has been received. Some communications, especially those including a request or indicating a previous commitment by the user could be classified as medium or high impact. The sender of a communication and other factors can be used to classify an individual communication as having a high, medium, or low impact.

Event: The term "event" is used broadly herein to mean any real or virtual interaction between a user and another entity. Events can include communication events, which refers to nearly any communication received or initiated by a computing device associated with a user including attempted communications (e.g., missed calls), communication intended for the user, initiated on behalf of the user, or available for the user. The term "event" may also refer to a reminder, task, announcement, or news item (including news relevant to the user such as local or regional news, weather, traffic, or social networking/social media information). Thus, by way of example and not limitation, events can include voice/video calls; email; SMS text messages; instant messages; notifications; social media or social networking news items or communications (e.g., tweets, Facebook posts or "likes", invitations, news feed items); news items relevant to the user; tasks that a user might address or respond to; RSS feed items; website and/or blog posts, comments, or updates; calendar events, reminders, or notifications; meeting requests or invitations; in-application communications including game notifications and messages, including those from other players; or the like. Some communication events may be associated with an entity (such as a contact or business, including in some instances the user himself or herself) or with a class of entities (such as close friends, work colleagues, boss, family, business establishments visited by the user, etc.). The event can be a request made of the user by another. The request can be inferred through analysis of signals received through one or more devices associated with the user.

Event data can be extracted from user data received from one or more data sources. The user data may be received by collecting user data with one or more sensors on user device(s) associated with a user, such as described herein. Examples of user data, which is further described in connection to component 214 of FIG. 2, may include location information of the user's mobile device(s), user-activity information (e.g., app usage, online activity, searches, calls), application data, contacts data, calendar and social network data, or nearly any other source of user data that may be sensed or determined by a user device or other computing device.

Events and user responses to those events may be determined by monitoring the user data, and from this, event patterns may be determined. The typical response to an event can be used to determine an urgency and impact for a notification related to the event. The event pattern can include whether or not a user completes regularly scheduled events, typically responds to a request within a communication, etc. In some cases, an urgency of an event may be detected based on a deviation from a determined pattern of events, such as where a user calls his grandmother every Sunday, but has not called her in several weeks.

The event may trigger a notification that can be presented on a channel selected based on the urgency and impact of the event. Contextual information about the event may also be determined from the user data or patterns determined from it, and may be used to determine a level of impact and/or urgency associated with the event. In some embodiments, contextual information may also be determined from user data of other users (i.e., crowdsourcing data). For example, crowdsourced data may be used to determine an impact of missing an event by analyzing actions taken in response. In such embodiments, the data may be de-identified or otherwise used in a manner to preserve privacy of the other users.

Some aspects of the technology further include using user data from other users (i.e., crowdsourcing data) for determining typical user response patterns to events of similar types, notification logic, and/or relevant supplemental content. For example, crowdsource data could be used to determine how much preparation time is typically needed before a scheduled event in order to be prepared for the event. The preparation time can inform the urgency associated with a notification. For example, if a day or more of preparation time is needed, then the event could be urgent a day or two prior to the actual event.

Notifications can be tied to task reminders. Tasks are type of event. Task reminders may be presented by a personal digital assistant operating on one or more of the user's client devices. Exemplary client devices include smartphones, tablets, augmented reality headsets, computers, navigation systems, and other devices. The task reminder may be a visual indication on a user's client device or may be audibly transmitted to the user.

A notification is a computer generated communication to a user that includes content about an event. The notification can include a description of the event, a due date, a location, and other event information.

Having briefly described an overview of aspects of the technology described herein, an exemplary operating environment suitable for use in implementing the technology is described below.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprises one or more sensors, which may be integrated into or associated with one or more of the user device(s) 102a, 102b, or 102n or server 106. Examples of sensed user data made available by data sources 104a though 104n are described further in connection to user-data collection component 214 of FIG. 2

Figure 2:
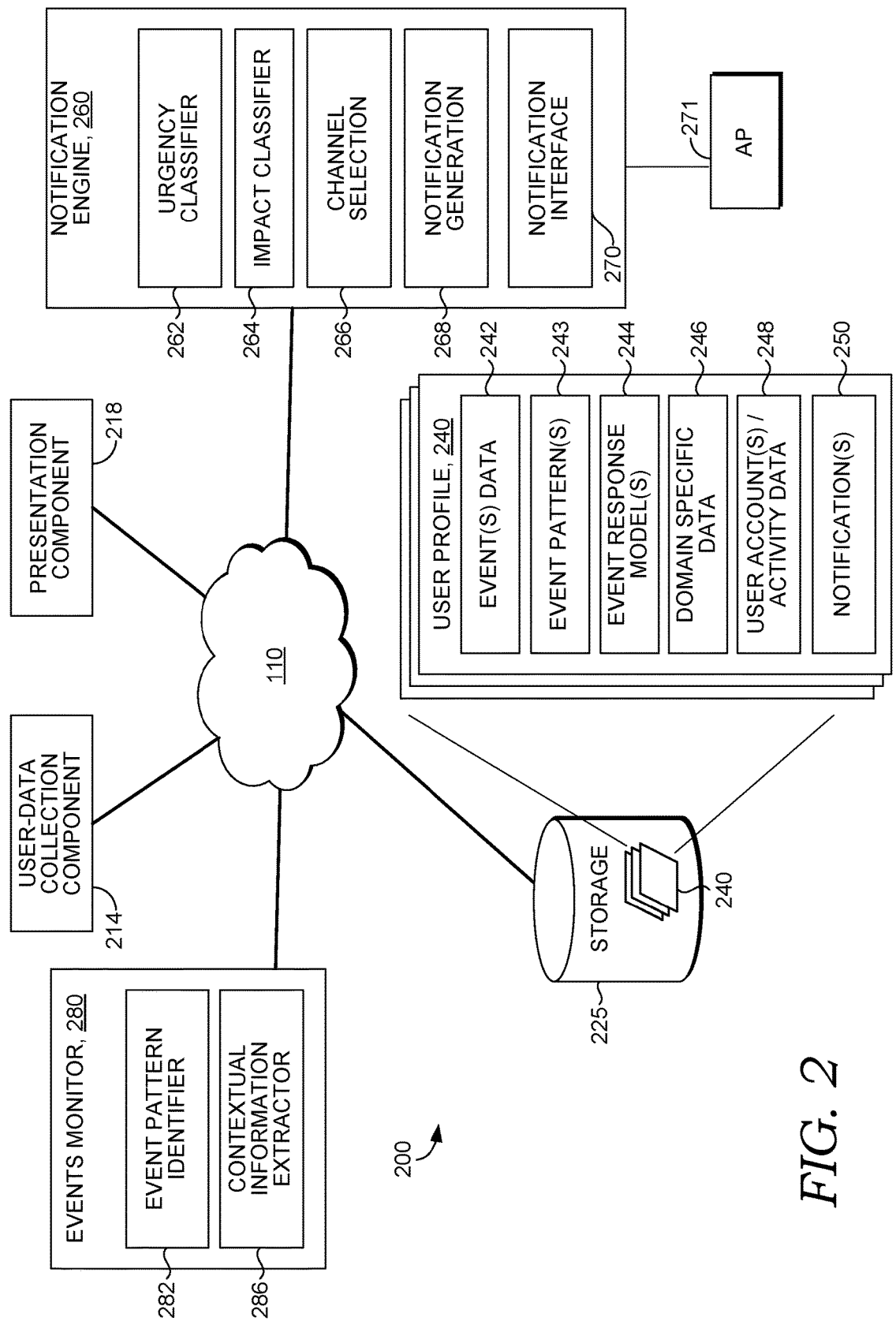
FIG. 2 is a diagram depicting an exemplary computing environment that can be used to select a communication channel for a notification, in accordance with an aspect of the technology described herein.

Operating environment 100 can be utilized to implement one or more of the components of system 200, described in FIG. 2, including components for determining an impact of an event, determining a urgency of an event, assigning a communication channel to an event based on the urgency and impact, collecting user data, monitoring events, generating notification content, and/or presenting notifications and related content to users. Referring now to FIG. 2, with FIG. 1, a block diagram is provided showing aspects of an example computing system architecture suitable for implementing an embodiment of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, events monitor 280, notification engine 260, application 271, presentation component 218, and storage 225. Events monitor 280 (including its components 282 and 286), notification engine 260 (including its components 262, 264, 266, 268, and 270), application 271, user-data collection component 214, and presentation component 218 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In some embodiments, user-data collection component 214 may be employed to facilitate the accumulation of user data of one or more users (including crowdsourced data) for events monitor 280 and notification engine 260. The data may be received (or accessed), and optionally accumulated, reformatted and/or combined, by data collection component 214 and stored in one or more data stores such as storage 225, where it may be available to events monitor 280 and notification engine 260. For example, the user data may be stored in or associated with a user profile 240, as described herein.

User data may be received from a variety of sources where the data may be available in a variety of formats. For example, in some embodiments, user data received via user-data collection component 214 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 214 receives or accesses data continuously, periodically, or as needed.

Events monitor 280 is generally responsible for monitoring events and related information in order to provide information used to determine the urgency and impact of an event and associated notification. As mentioned, each notification is associated with an underlying event. The events monitor 280 can identify event patterns, event response information, notification patterns, and contextual information associated with events. The event patterns and other event information can be used by the notification engine 260 to determine urgency and impact of an event. The event information can also be saved in the user profile 240 as event data 242.

The event data can be used to identify implicit events and a need for associated notifications. As described previously, events and user responses to those events may be determined by monitoring user data (including data received from user-data collection component 214), and from this, event patterns may be determined. In some embodiments, events monitor 280 monitors events and related information across multiple computing devices or in the cloud.

As shown in example system 200, events monitor 280 comprises an event pattern identifier 282 and a contextual information extractor 286. In some embodiments, events monitor 280 and/or one or more of its subcomponents may determine interpretive data from received user data. Interpretive data corresponds to data utilized by the subcomponents of events monitor 280 to interpret user data. For example, interpretive data can be used to provide context to user data, which can support determinations or inferences made by the subcomponents, such as the urgency or impact of an event. Moreover, it is contemplated that embodiments of events monitor 280 and its subcomponents may use user data and/or user data in combination with interpretive data for carrying out the objectives of the subcomponents described herein.

Event pattern identifier 282, in general, is responsible for determining event patterns. In some embodiments, event patterns may be determined by monitoring one or more variables related to events or user responses to those events. These monitored variables may be determined from the user data described in connection to user-data collection component 214 (for example: location, time/day, the initiator(s) or recipient(s) of a communication, the communication type (e.g., call, email, text, etc.), user device data, etc.). In particular, the variables may be determined from contextual data related to events, which may be extracted from the user data by contextual information extractor 286, as described herein. Thus, the variables can represent context similarities among multiple events. In this way, patterns may be identified by detecting variables in common over multiple events. More specifically, variables associated with a first event may be correlated with variables of a second event to identify in-common variables for determining a likely pattern. For example, where a first event comprises a user-initiated call to a contact identified as "mom" on Saturday and a second event comprises a user-initiated call to the same contact ("mom") on the following Saturday, a pattern may be determined that the user calls "mom" on Saturday. In this case, the in-common variables for the two events include the same contact-entity (mom), the same day (Saturday), that the communication was user-initiated, the same recipient of the communication (mom), and the same type or mode of communication (a call).

An identified pattern becomes stronger (i.e., more likely or more predictable) the more often the event instances that make up the pattern are repeated. Similarly, specific variables can become more strongly associated with a pattern as they are repeated. For example, suppose every day after 5 pm (after work) and while driving, a user calls someone in the same group of contacts (which could be her family members). While the specific person called varies (i.e., the contact-entity that the user calls), an event pattern exists because the user repeatedly calls someone in this group.

Further, in some embodiments, event pattern identifier 282 determines response information using crowdsourcing data or data from multiple users, which can be used for determining likely response patterns for a particular user based on the premise that the particular user will react similar to other users. For example, a user pattern may be determined based on determinations that certain events have a particular impact or urgency. Similarly, a user pattern may be determined based on determinations that other users typically call their spouse back at a soonest convenient time, but call their boss back as soon as possible even if it is inconvenient.

Moreover, in some embodiments, contextual information extractor 286 provides contextual information corresponding to similar events from other users, which may be used to determine responses of those users. Other users with similar events may be identified by determining context similarities, such as variables in the events of the other users that are in common with variables of the events of the particular user. For example, in-common variables could include the relationships between the parties (e.g., the relationship between the user and the recipient or initiator of a communication event), location, time, day, mode of communication, or any of the other variables described previously. Accordingly, event pattern identifier 282 can learn response patterns typical of a population of users based on crowd-sourced user information (e.g., user history, user activity following (and in some embodiments preceding) an associated event, relationship with contact-entities, and other contextual information) received from multiple users with similar events. Thus, from the response information, it may be determined what are the typical responses undertaken when an event having certain characteristics (e.g., context features or variables) occurs.

Contextual information extractor 286, in general, is responsible for determining contextual information associated with the events monitored by events monitor 280, such as context features or variables associated with events and user-related activity, notifications provided, and user responses to the notifications. Contextual information may be determined from the user data of one or more users provided by user-data collection component 214. For example, contextual information extractor 286 receives user data, parses the data, in some instances, and identifies and extracts context features or variables. In some embodiments, variables are stored as a related set of contextual information associated with an event, response, or user activity within a time interval following an event (which may be indicative of a user response).

In particular, some embodiments of contextual information extractor 286 determine contextual information related to an event, contact-entity (or entities, such as in the case of a group email), user activity surrounding the event, and current user activity. By way of example and not limitation, this may include context features such as location data; time, day, and/or date; number and/or frequency of communications; keywords in the communication (which may be used for determining impact or urgency); contextual information about the contacting entity (such as the entity identity, relation with the user, location of the contacting entity if determinable, frequency or level of previous contact with the user); history information including patterns and history with the contact-entity; mode or type of communication(s); what user activity the user engages in when an event occurs or when likely responding to an event, as well as when, where, and how long the user engages in activity associated with the event or a likely response to an event; or any other variables determinable from the user data, including user data from other users. Other examples of contextual information include confidence levels, variance levels, and other information generated in identifying an event or user response to an event.

As described above, the contextual information may be provided to: event pattern identifier 282 for determining patterns (such as event patterns using in-common variables). In particular, contextual information may be used for determining information about user response patterns to notifications, user-activities that may correspond to responding to a notification, how long a user engages in responding to an event in order to determine urgency, modes of communication, or other information for determining an urgency or impact for certain types of events, which may be used for determining the communication channel used to present a notification for the event. Additionally, contextual information may be provided to notification engine 260 and used for determining urgency or impact of a missed event, availability of the user for handling an event, supplemental content for assisting the user in addressing the event, and logic for presenting a notification to a user, such as when, where, or how to present notification content.

Continuing with FIG. 2, notification engine 260 is generally responsible for generating and providing notifications regarding an event to the user. The notification engine 260 selects the appropriate communication channel based on the urgency and impact of an event associated with the notification. The notification engine 260 can determine or confirm an urgency and/or impact of an event or the notification engine 260 can act based on the urgency and impact provided by another entity, such as the application 271.

In one embodiment, the notification content includes a notification, which may be in the form of a recommended action for the user to address an event, and may further include supplemental content for assisting the user in addressing the event. In some cases, the notification content includes notification logic specifying conditions for presenting the notification based on user data, such as time(s), location(s), mode(s), or other parameters relating to presenting a notification from the notification content.

For example, notification content may include a notification to the user to return a call from his wife. The notification may present a text or audio query asking the user "do you want to call your wife now?" Based on an affirmative response from the user (e.g., saying "yes" or touching a "yes" button on his mobile device), the user's wife is automatically called, without the user having to provide the phone number. Continuing this example, the notification content may include supplemental content, such as reminding the user that his wife is boarding a flight in 45 minutes and that this will be his only opportunity to call her before she departs.

In some embodiments, notification engine 260 generates a notification to be presented to a user, which may be provided to presentation component 218. Alternatively, in other embodiments, notification engine 260 generates notification content and makes it available to presentation component 218, which determines when and how (i.e., what format) to present the notification based on notification logic in the notification content and user data applied to the notification logic. In some embodiments, a notifications service or application operating in conjunction with presentation component 218 determines or facilitates determining when and how to present the notification. Pending notifications associated with a user may be stored in a user profile 240, such as in a notification(s) component 250. Further, in some embodiments, notification engine 260, presentation component 218, and/or a notifications service or application manages pending notifications for a user and may prioritize which notifications are presented, such as described below.

As described previously, notification engine 260 may receive information from user-data collection component 214 and/or events monitor 280 (which may be stored in a user profile 240 that is associated with the user) including event data; current user information, such as user activity; event data, which may also include a determined likelihood that the event is unaddressed; contextual information; response information (including in some instances how other users respond or react to similar events); event pattern information, user availability models, or availability pattern information; or information from other components or sources used for creating notification content. In one embodiment, using the received information described above, notification engine 260 determines an impact or urgency associated with an event. Notification engine 260 may also generate supplemental content and notification logic, which may be based on the determined urgency, impact, and context associated with the event.

As shown in example system 200, notification engine 260 comprises urgency classifier 262, impact classifier 264, channel selection component 266, notification generator 268, and notification interface 270. Urgency classifier 262, in general, is responsible for determining an urgency level for an event. An urgency level may indicate how soon the event should be addressed. Some embodiments of notification engine 260 may determine urgency, impact, or both. Moreover, an event may become more urgent as a deadline approaches (such as the bill pay event described previously), and the impact level and/or urgency level may be updated based on changes detected in contextual information, current user data, the user's response, newly detected user patterns, or new events that are determined to be related to an already outstanding event. For example, a missed call from a boss following an unresponded-to email may indicate a higher urgency level for responding to the email.

In some embodiments, urgency classifier 262 determines an urgency level (which may be embodied as a level or numerical value) using information about the event, along with user data received (from user-data collection component 214) or contextual information (provided by contextual information extractor 286), or other data provided by events monitor 280, user profile 240, or presentation component 218. For example, urgency classifier 262 may consider similar events and their frequency (such as repeated missed calendar entries or an unresponded-to task); previous responses to similar events from the user or other users, which may indicate a level of urgency, based on how soon after the similar event occurred the user(s) responded; or pattern information such as whether the event is associated with a pattern or whether it is unexpected.

User settings or preferences regarding the urgency of addressing certain events may be explicitly specified by the user or learned (e.g., an urgency level assigned to communications from a boss, travel events, or all communications from close friends). The user's relation to the contact-entity (for example, is this an acquaintance, a close friend, family member, co-worker, boss, etc.), which may include how the user has identified this entity in a contacts roster or social media account and/or the user's history for communicating with this contact and level of contact with the entity. For example, a missed call from a user's friend may be determined to be more urgent than a missed call from a salesman who has no previous contact with the user. A voicemail left by the salesman or friend may warrant a notification. Similarly, a "missed call" event may be associated with a notification. The person associated with the call is an input used to determine the urgency when a firm "due date" is not associated with the missed call event. In one aspect, a typical call back time is determined by averaging previous call backs to determine a call back deadline.

In some embodiments, the urgency level may be determined from contextual information based on context features associated with the event (including extracted keywords or other context features extracted from similar events). In particular, as described previously, keywords and other context features may be extracted by contextual information extractor 286 and used to determine information about user responses for one or more users, such as information about how users typically respond (including how quickly they respond), based on certain keywords or other context features associated with the event. Additionally some keywords may be predetermined to indicate possible urgency (such as "urgent," "immediate," or similar words that may be present in communications).

In some embodiments, using the received information described in the preceding two paragraphs, a degree of urgency may be determined for an event and used for determining a value representing the level of urgency. For example, in an embodiment, the level of urgency for an event may be determined relative to previous responses of the user or similar responses of other users, including handling events previously determined to be urgent or previously determined to be not urgent. In this way, the determined level may be determined based on a comparison to similar events and the extremes (urgent events and not urgent events) and how those events were handled. In one aspect, an event is classified as urgent or not urgent.

In some embodiments, an urgency level has an associated probability or confidence indicating a likelihood of the determined urgency. The confidence may be determined based on the amount of contextual information potentially indicating urgency and/or the magnitude (or weight) associated with specific pieces of contextual information. (For example, an email from the user's boss that is designated as a "high impact" message would have more weight than an email from the boss with normal importance.)

The confidence level may be determined by a classification program that is trained using labeled training data that is mapped to an urgency level. Once trained, the classification program assigns a confidence level related to urgency. The confidence level can then be mapped to an urgency level, for example, either urgent or not urgent. Each urgency level can have a threshold of confidence level.

Embodiments of notification engine 260 also comprise an impact classifier 264. The impact classifier 264 classifies an event a high impact, medium impact, or low impact. The impact associated with an event can be classified as high, medium, or low. A high impact event is one where not completing the event causes the user a loss of time and/or money. For example, failing to pay a bill on time could cause a loss of money when a late fee is then incurred. Missing an airplane flight can cause a significant loss in time and possibly money. The loss of time may be measured against a baseline behavior pattern for the user. The loss of time would occur as measured against the user's baseline behavior pattern. For example, if a user typically takes a train to work the loss of time caused by missing a first train could be measured by how long the user has to wait for the next train. When missing a train, the user could deviate from their typical behavior pattern and take a cab to work, which may or may not cause a loss of time. Nevertheless, the loss of time could be determined using the assumption that the user is going to continue with their typical behavior pattern (e.g., riding the train).

A medium impact level is assigned when the event is an optimization of a user's baseline behavior pattern that could save time or money, but missing the event will not cause a loss of time or money when compared to the user's baseline. For example, suggesting a new route home when the baseline route followed by the user indicates a delay. In this example, the notification would give the user the option of changing baseline behavior.

A low impact level is assigned when the event or responding to the event is optional. For example, a notification indicating a favorite TV show is about to start or that certain communications (e.g., text, email) has been received. Some communications, especially those including a request or indicating a previous commitment by the user could be classified as medium or high impact. The sender of a communication and other factors can be used to classify an individual communication as having a high, medium, or low impact.

In some embodiments, impact classifier 264 determines an impact level (which may be embodied as a level or numerical value) using information about the event, along with user data received (from user-data collection component 214) or contextual information (provided by contextual information extractor 286), or other data provided by events monitor 280, user profile 240, or presentation component 218. For example, impact classifier 264 may consider similar events and their frequency (such as repeated missed calendar entries or an unresponded-to task); previous responses to similar events from the user or other users, which may indicate a level of impact, based on how the user(s) responded to missing an event or other consequences from missing event; or pattern information such as whether the event is frequently missed by the user or other similar users. An event that is frequently missed may be assigned a low impact.

User settings or preferences regarding the impact of certain events may be explicitly specified by the user or learned (e.g., an impact level assigned to communications from a boss, travel events, or all communications from close friends). The user's relation to the contact-entity (for example, is this an acquaintance, a close friend, family member, co-worker, boss, etc.), which may include how the user has identified this entity in a contacts roster or social media account and/or the user's history for communicating with this contact and level of contact with the entity. For example, failing to return a missed call from a user's friend may have more impact than a missed call from a salesman who has no previous contact with the user. A voicemail left by the salesman or friend may warrant a notification. Similarly, a "missed call" may be associated with a notification for a call-back event. The person associated with the call is an input used to determine the impact.

In some embodiments, an impact level has an associated probability or confidence indicating a likelihood of the determined impact. The confidence may be determined based on the amount of contextual information potentially indicating impact and/or the magnitude (or weight) associated with specific pieces of contextual information. (For example, an email from the user's boss that is designated as a "high impact" message would have more weight than an email from the boss with normal importance.)

The confidence level may be determined by a classification program that is trained using labeled training data that is mapped to an impact level. Once trained, the classification program assigns a confidence level related to impact. The confidence level can then be mapped to an impact level, for example, high, medium, or low. Each impact level can have a threshold of confidence level.

The channel selection component 266 selects the communication channel for a notification based on the urgency and impact of an event associated with a notification. In one aspect, the channel selection component 266 selects a channel according to the impact and urgency of the event.

As used herein a communication channel can comprises one or more output mechanisms available in a computing device. Output mechanisms include a speaker, a screen, a light, and haptic feedback mechanisms, such as a vibration mechanism. For example, a communication channel could comprise the combination of an audible sound emitted from a speaker and a visible notification displayed through a screen.

In one aspect, each communication channel is mapped to a combination of the impact level and the urgency level. Different urgency levels and impact cause communication channels with different levels of intrusiveness to be selected.

In one aspect, a high-Intrusiveness level communication channel is selected for a notification related to an urgent event with high impact. A communication channel assigned a high level of intrusiveness requires a user interaction to disable the notification and no proactivity on the part of the user to find the notification. Different combinations of output mechanisms can be used to form a high-intrusiveness level communication channel.

When multiple high-intrusiveness level channels are available, a specific channel can be selected according to the context of the device. For example, if the device context indicates that a user is viewing a display screen and interacting with it then a visual notification presented on the top z-layer of the interface and requiring a physical interaction to dismiss may be selected as the high-intrusiveness level communication channel. On the other hand, if the device context indicates no present user interactions then an audible notification may be provided in combination with visual indications to draw the user's attention to the device.

In one aspect, medium-intrusiveness level communication channel is selected for a notification related to an event with high urgency and medium impact or an event with low urgency and high impact. A communication channel assigned a medium level of intrusiveness does not require user proactivity to find the notification, but does not require a user interaction to dismiss the notification.

In one aspect, a low-Intrusiveness level communication channel is selected for a notification with a low urgency and low impact. A communication channel assigned a low level of intrusiveness requires user proactivity to find the notification and also does not require a user interaction to disable or dismiss the notification. While a user interaction to disable the notification is not required for low or medium level communication channels, the notifications can include a dismiss interface. For example, a list of low level notifications could include a delete function to have the reminder removed from the list.

Returning to FIG. 2, notification generator 268, in general, is responsible for presenting notification content to users through the communication channel selected by the channel selection component 266.

The notification interface 270 can receive notification requests from applications, such as application 271. The notification request asks the notification engine to communicate a notification to the user. The notification request can include an impact and urgency along with notification content. The notification request can also include content.

Continuing with FIG. 2, some embodiments of events monitor 280 and notification engine 260 use statistics and machine learning techniques. In particular, such techniques may be used to determine pattern information associated with a user, such as event patterns, user response patterns, certain types of events, user preferences, as well as events, urgency, impact, user availability, and other notification content associated with the events. For example, using crowd-sourced data, aspects of the technology can learn to associate keywords or other context features (such as the relation between the contacting entity and user) with higher levels of impact or urgency, based on determining how other users respond or react to an event where those keywords or context features are present. In one embodiment, pattern recognition, fuzzy logic, clustering, or similar statistics and machine learning techniques are applied.

Example system 200 also includes a presentation component 218 that is generally responsible for presenting notifications and related content to a user, based on the notification content determined by notification engine 260. Presentation component 218 may comprise one or more applications or services on a user device, across multiple user devices, or in the cloud. For example, in one embodiment, presentation component 218 manages the presentation of notification content to a user across multiple user devices associated with that user.

In some embodiments, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some embodiments, a personal assistant service or application operating in conjunction with presentation component 218 determines when and how to present the notification. In such embodiments, the notification content may be understood as a recommendation to the presentation component 218 (and/or personal assistant service or application) for when and how to present the notification, which may be overridden by the personal assistant app or presentation component 218.

In an embodiment, notifications can be presented to a user as a to-do list. For example, notifications assigned low impact and low urgency may be added to a to-do list that requires user proactivity to access.

Example system 200 also includes storage 225. Storage 225 generally stores information including data, computer instructions (e.g., software program instructions, routines, or services), and/or models used in aspects of the technology described herein. In an embodiment, storage 225 comprises a data store (or computer data memory). Further, although depicted as a single data store component, storage 225 may be embodied as one or more data stores or may be in the cloud.

In an embodiment, storage 225 stores one or more user profiles 240, an example embodiment of which is illustratively provided in FIG. 2. Example user profile 240 may include information associated with a particular user or, in some instances, a category of users. As shown, user profile 240 includes event(s) data 242, event pattern(s) 243, event response model(s) 244, availability model(s) 246, user account(s) and activity data 248, and notification(s) 250. The information stored in user profiles 240 may be available to the routines or other components of example system 200.

Event(s) data 242 generally includes information related to events associated with a user, and may include information about events determined by events monitor 280, contextual information, and may also include crowd-sourced data. Event pattern(s) 243 generally includes information about determined event patterns associated with the user; for example, a pattern indicating that the user calls his mom every Sunday. Information stored in event pattern(s) 243 may be determined from event pattern identifier 282. Event response model(s) 244 generally includes response information regarding how the particular user (or similar users) responds to events.

Domain specific data 246 can include data that is consumed or output by a domain specific classifier. As mentioned, notification engines can be domain specific. For example, a domain-specific notification engine could mine emails for requests of the user and commitments made by the user and generate notifications around these commitments and requests. In this case, the domain specific data could comprise a record of a user's interactions with requests and commitments.

User account(s) and activity data 248 generally includes user data collected from user-data collection component 214 (which in some cases may include crowd-sourced data that is relevant to the particular user) or other semantic knowledge about the user. In particular, user account(s) and activity data 248 can include data regarding user emails, texts, instant messages, calls, and other communications; social network accounts and data, such as news feeds; online activity; calendars, appointments, or other user data that may have relevance for determining events; user availability; and impact, urgency, or notification logic. Embodiments of user account(s) and activity data 248 may store information across one or more databases, knowledge graphs, or data structures.

Notification(s) 250 generally includes data about pending notifications associated with a user, which may include notification content corresponding to one or more events. In some embodiments, notification(s) 250 includes data corresponding to notifications that have not yet been presented to a user or supplemental content that may not be provided to a user. (Further, in some embodiments, notification(s) 250 may also include information about previously pending notifications.)

Figure 3:
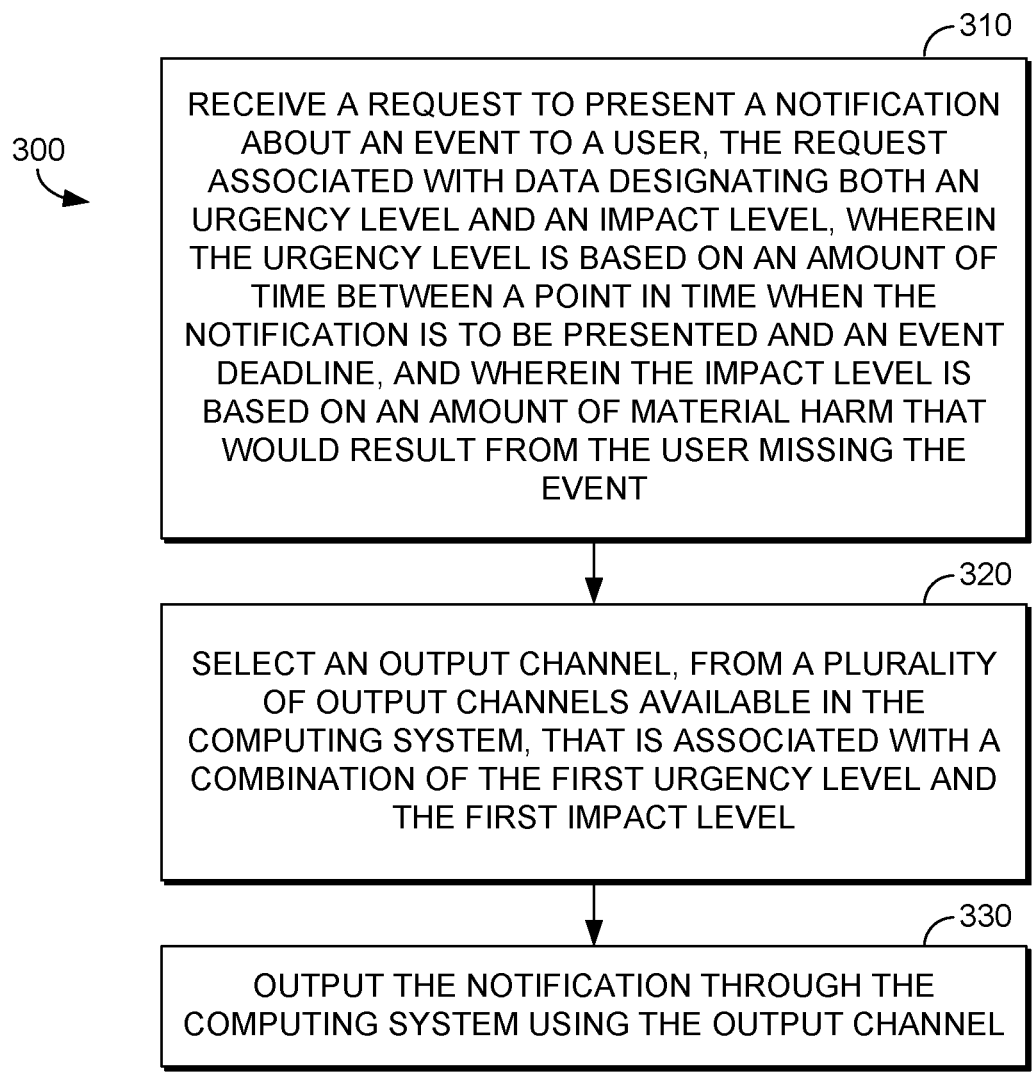
FIG. 3 is a diagram depicting a method of selecting a communication channel for a notification, in accordance with an aspect of the technology described herein.

Turning now to FIG. 3, a method 300 for selecting an communication channel for a notification is provided, in accordance with an aspect of the present invention. As previously mentioned, the phrase "communication channel" can comprise a single output mechanism or multiple output mechanisms. Exemplary output mechanisms include an audible sound, a vibration, and interface displays in various forms. For example, a notification could be displayed on an interface that requires the user to navigate to the interface to find information about the notification. In another example, the notification is presented as the top or active interface that the user can see without needing to take any proactive steps. These represent distinct output mechanisms, though both use the same device hardware, namely the display. Accordingly, an output mechanism can be a combination of hardware used and interface features.

The method 300 could be performed by an end user device, such as a mobile phone, tablet, e-reader, augmented reality glasses, virtual reality glasses, a personal computer, a laptop, or other computing device. The method 300 could also be performed in whole or in part by a server that generates notifications that are presented on a remote computing device, for example as part of a web page.

In step 310, a request to present a notification about an event to a user is received. The request can include information designating both an urgency level and an impact level for the event. As mentioned, the urgency level is based on an amount of time between a point in time when the notification is to be presented and an event deadline. In one aspect, the time when the notification is to be presented more or less coincides with the time in which the request to present the notification is received. In other words, a computing application that generates the notification request can specify an instantaneous notification. In other aspects, the request can have a notification time specifying when the notification should be or is requested to be presented to the user.

In one aspect, the request includes the urgency level and the impact level. The impact level and urgency level can be determined by a computing device or a computing application that generates the notification request. In another aspect, an intermediary application receives a notification request that includes event information. The event information is then analyzed to assign an urgency level and an impact level and then generate a request that includes both the input level and the urgency level for assignment of an communication channel In one aspect, the urgency classification and impact classification can be domain-specific. For example, travel events may be assigned an impact level and urgency level by a trained classifier designed to analyze travel events. The travel-based event classifier could be trained using travel-related event details. Similarly, a work event classifier, a social event classifier, an exercise-based classifier, and other classifiers could be used to determine various events and the associated impact level and urgency level.

The impact level is based on the amount of material harm that would result from the user missing the event or being late to the event. The material harm can comprise a loss of time or money when compared with a projected or normal outcome associated with the user participating in the event at the appropriate time. Events have been described previously herein.

Various methods may be used to determine an urgency level and to calculate an amount of time between the point in time when the notification is to be presented and an event deadline. In many cases, an event deadline is not readily apparent and must be determined. Other events have a fairly straightforward deadline. Examples of events with a straightforward deadline include calendar entries and activities with a defined start time, such as a sporting event and airline travel.

Other events are not readily associated with an event deadline. In some cases, only partial information about an event is available and a partial information does not include a start time component or a completion deadline. For example, an event could be extracted from an analysis of a user's e-mail exchange indicating that the user is to have lunch with her mom at Bob's Pizza Palace this Thursday. However, the specific time at which the two are to have lunch may not be included in the communication correspondence. The time for lunch could be excluded because the two have a normal lunch time or otherwise communicated through a telephone conversation or other mechanism that was not detectable to the computing device. In this situation, the user's previous pattern of lunch events could be analyzed to determine a typical time when the user meets people for lunch. For example, the user's calendar could be mined for appointments occurring over the lunch hour and/or specifically labeled as lunch. A typical lunch time could be derived through an analysis of crowdsourced information. If information is available about the other party having lunch, in this case the user's mom, the typical time that the mom meets for lunch could be determined. In this case, the event deadline could be assigned as a typical lunchtime of one or more parties to be at the lunch.

In one aspect, the determination of the event deadline includes a safety margin that moves the event deadline forward. For example, a user could typically have lunch at noon but might occasionally have lunch as early as 11:00 or as late as 1:00. In this case, the earliest practical time for the lunch appointment could be selected rather than the average time when the user has lunch. Event deadlines for other similar types of events could be extracted by analyzing the user's previous start times for similar events. In one example, the user's previous events with a similar classification are analyzed and the event deadline is set to the earliest time the user participated in an event with a similar classification. In another instance, an average time for similar events is calculated and then the event deadline is one standard deviation earlier than the average time.

Once an event deadline is established for an event, then the urgency level can be calculated by taking the difference between the time when the notification is to be presented and the event deadline. In one aspect, the urgency level is established based on various threshold periods of time. The thresholds could be different for different classes or categories of events. The phrase or term "domain" may also be used to characterize a class or category of events. For example, events classified as social events may have a different urgency level threshold than events classified as work related. In one instance, the threshold amount of time for the highest urgency level is assigned as occurring within the same day. In other words, if the notification is to be presented at 7:00 a.m., 9:00 a.m., 11:30 a.m., 1:00 p.m., 3:00 p.m., or 4:00 p.m. the same day as an event associated with an event deadline of 5:00 p.m., then the urgency level would be set to the highest level. In other instances, the urgency level could be a fixed amount of time such as one hour, two hours, three hours, four hours, or such. In one instance, the urgency level is classified as a binary high or low urgency. Whatever the threshold used, if the amount of time between the point in time when the notification is to be presented and the event deadline is less than or equal to the threshold, then the urgency level is set to high.

The impact level is based on whether an amount of material harm that would result from the user missing the event. The impact level can be determined based on a classifier that takes annotated events data as input to train a classifier that generates an impact level. As an example, a group of users could annotate event data in event scenarios and assign an impact level as high, medium, or low to various event scenarios. Once trained, the impact classifier can assign an impact level based on an analysis of event data. In essence, the actual event data is compared with the training data to determine similarity with the training data and classify the event into an impact category.

As a supplement or alternative, various impact scenarios can be assigned a particular impact level. Event details conforming to the exemplary impact scenarios could be assigned an impact level consistent with this scenario. In this situation, events that do not fit a particular scenario could be assigned a medium level impact. The impact level can be assigned a high, medium, or low level in one instance.

A high impact event is one where not completing the event causes the user a loss of time and/or money. For example, failing to pay a bill on time could cause a loss of money when a late fee is then incurred. Missing an airplane flight can cause a significant loss in time and possibly money. The loss of time may be measured against a baseline behavior pattern for the user. The loss of time would occur as measured against the user's baseline behavior pattern. For example, if a user typically takes a train to work the loss of time caused by missing a first train could be measured by how long the user has to wait for the next train. When missing a train, the user could deviate from their typical behavior pattern and take a cab to work, which may or may not cause a loss of time. Nevertheless, the loss of time could be determined using the assumption that the user is going to continue with their typical behavior pattern (e.g., riding the train).

A medium impact level is assigned when the event is an optimization of a user's baseline behavior pattern that could save time or money, but missing the event will not cause a loss of time or money when compared to the user's baseline. For example, suggesting a new route home when the baseline route followed by the user indicates a delay. In this example, the notification would give the user the option of changing baseline behavior.

A low impact level is assigned when the event or responding to the event is optional. For example, a notification indicating a favorite TV show is about to start or that certain communications (e.g., text, email) has been received. Some communications, especially those including a request or indicating a previous commitment by the user could be classified as medium or high impact. The sender of a communication and other factors can be used to classify an individual communication as having a high, medium, or low impact.

At step 320, an communication channel that is associated with an intrusiveness level mapped to the urgency level and the impact level is assigned to the notification. In one aspect, each communication channel is associated with an intrusiveness level. Exemplary intrusiveness levels can include a high intrusiveness level, a medium intrusiveness level, and a low intrusiveness level. The communication channel can have only one intrusiveness level, but multiple communication channels can have the same intrusiveness level. For example, multiple communication channels could have a high intrusiveness level. When multiple communication channels of the same intrusiveness level exist, the selection can be based on contextual factors, such as whether or not the user is interacting with the computing device. If the user is not interacting with the computing device, an audible alarm may be selected as an communication channel. On the other hand, if the user is currently interacting with the computing device, then an communication channel that includes only a visual display may be appropriate.

In one aspect, a high intrusiveness level is mapped to a high urgency level and a high impact level event. A medium intrusiveness level is mapped to a low urgency level and a medium impact level or a high urgency level and medium impact level event. A low intrusiveness level is mapped to a low urgency level and a low impact level.

At step 330, the notification is output through the computing system using the communication channel. The notification can be output by interfacing operating system components that control output mechanisms, such as speakers and displays, on an computing device.

Figure 4:
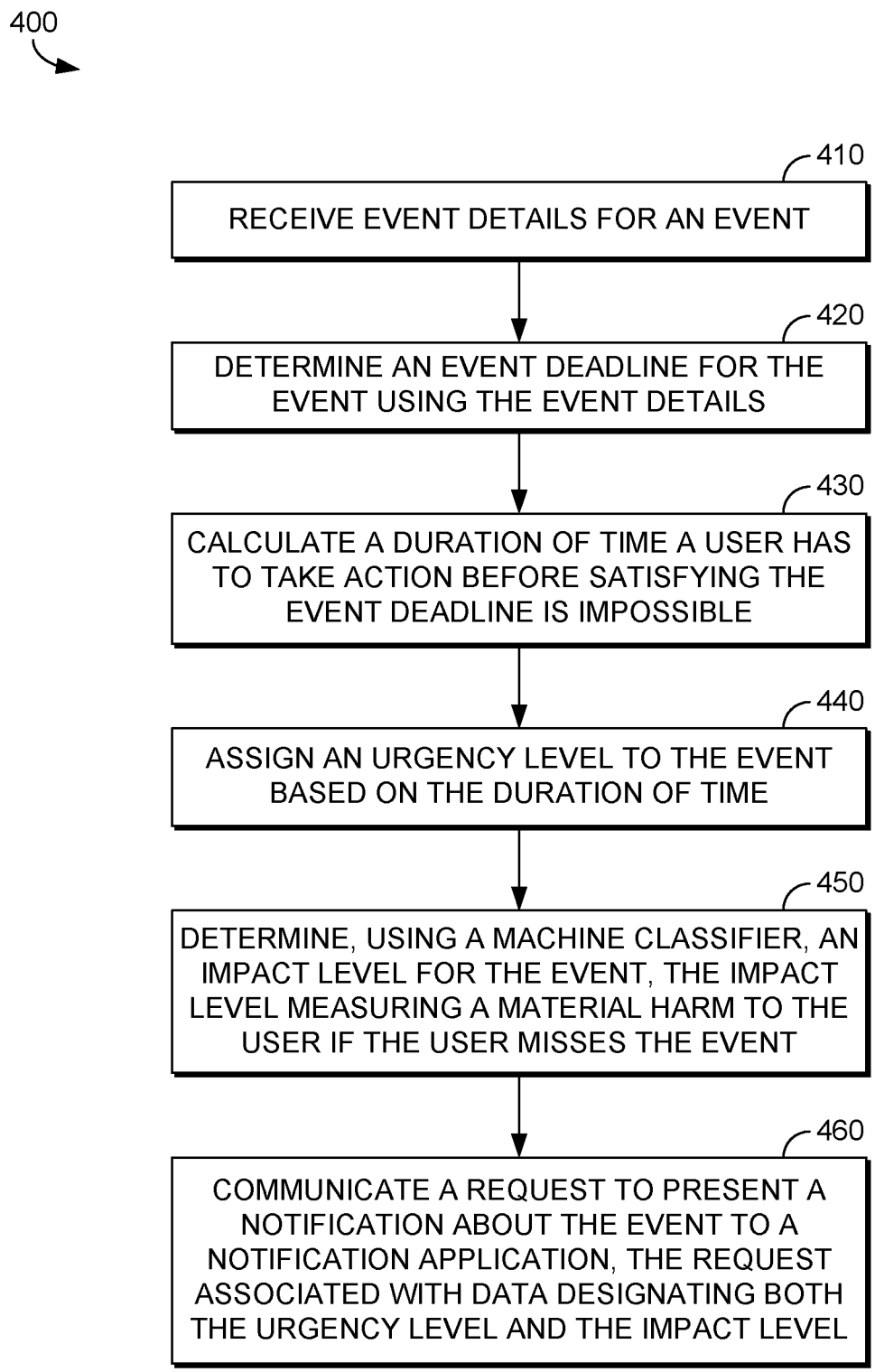
FIG. 4 is a diagram depicting a method of selecting a communication channel for a notification, in accordance with an aspect of the technology described herein.

Turning to FIG. 4, a method 400 of selecting an communication channel for a notification associated with an event is provided, in accordance with an aspect of the present invention. Events and notifications have been described previously herein.

At step 410, event details for an event associated with a notification are received. The event details may be provided by an application that has instructions to present a notification through a computing device. For example, a reservation application may have instructions to present a notification reminding the user of an upcoming reservation. In this case, the event details could include the name of the restaurant, other parties, and a time and date for the reservation.

At step 420, an event deadline for the event is determined using the event details. In some cases, natural language processing is used to extract an event deadline from the event details. For example, the reservation time and date may be provided in the event details. The event details may be provided in an unstructured format that requires an analysis of the event details using natural language processing or other mechanisms to extract the time and date of the reservation.

In other aspects, the event details do not include an explicit event deadline, and the event deadline needs to be derived from the event details in combination with an analysis of an event history, as described previously.

The event details may be used to classify the event into one or more existing event classifications. Exemplary event classifications include a social classification, a work classification, a travel classification, and an exercise classification. Sub-classifications within these classifications may be possible and aspects of the technology described herein are not limited to these classifications. As mentioned previously, the event details may be provided to a classifier trained according to a category or domain of the event. The classifier may assign an event deadline based on the event details. For example, if the user demonstrates a regular pattern of exercising at 6:00 a.m., then a detected exercise event without a specific time may be assigned the event deadline of 6:00 a.m.

At step 430, a duration of time between the event deadline and a time when the notification is to be presented is calculated. The time when the notification is to be presented may be more or less contemporaneous with a time when the event details were received. In another aspect, a request to communicate a notification can be associated with a time when the notification is to be presented to the user. The duration of time is the difference between the time when the notification is to be presented and the event deadline.

At step 440, an urgency level is assigned to the event based on the duration of time being in a range associated with the urgency level. While this step is described as associating an urgency level to the event, as used herein, assigning an urgency level to an event is the same thing as assigning an urgency level to a notification associated with an event. As mentioned, the urgency level measures how soon an event will occur. The sooner the event, the higher the urgency level. In one case, aspects of the technology described herein use a threshold to determine whether the urgency level is high or low. In one aspect, the urgency level is high when the event deadline occurs on the same day as the notification. In another aspect, an urgency level can be high when it is to be presented within a threshold amount of time from the event deadline. The threshold amount of time could be one hour, two hours, three hours, four hours, five hours, etc. In one aspect, different thresholds are applied to different categories of events. For example, a work event occurring at a work location in which a user is presently located may have a threshold of an hour or less. On the other hand, a notification associated with a travel event that will occur at a location different from where the user is currently located could be associated with a threshold of four hours, six hours, eight hours, or similar.

At step 450, an impact level for the event is determined using a machine classifier. The impact level is based on whether an amount of material harm that would result from the user missing the event. The impact level can be determined based on a classifier that takes annotated events data as input to train a classifier that generates an impact level. As an example, a group of users could annotate event data in event scenarios and assign an impact level as high, medium, or low to various event scenarios. Once trained, the impact classifier can assign an impact level based on an analysis of event data. In essence, the actual event data is compared with the training data to determine similarity with the training data and classify the event into an impact category.

As a supplement or alternative, various impact scenarios can be assigned a particular impact level. Event details conforming to the exemplary impact scenarios could be assigned an impact level consistent with this scenario. In this situation, events that do not fit a particular scenario could be assigned a medium level impact. The impact level can be assigned a high, medium, or low level in one instance.

A high impact event is one where not completing the event causes the user a loss of time and/or money. For example, failing to pay a bill on time could cause a loss of money when a late fee is then incurred. Missing an airplane flight can cause a significant loss in time and possibly money. The loss of time may be measured against a baseline behavior pattern for the user. The loss of time would occur as measured against the user's baseline behavior pattern. For example, if a user typically takes a train to work the loss of time caused by missing a first train could be measured by how long the user has to wait for the next train. When missing a train, the user could deviate from their typical behavior pattern and take a cab to work, which may or may not cause a loss of time. Nevertheless, the loss of time could be determined using the assumption that the user is going to continue with their typical behavior pattern (e.g., riding the train).

A medium impact level is assigned when the event is an optimization of a user's baseline behavior pattern that could save time or money, but missing the event will not cause a loss of time or money when compared to the user's baseline. For example, suggesting a new route home when the baseline route followed by the user indicates a delay. In this example, the notification would give the user the option of changing baseline behavior.

A low impact level is assigned when the event or responding to the event is optional. For example, a notification indicating a favorite TV show is about to start or that certain communications (e.g., text, email) has been received. Some communications, especially those including a request or indicating a previous commitment by the user could be classified as medium or high impact. The sender of a communication and other factors can be used to classify an individual communication as having a high, medium, or low impact.

At step 460 a request to present a notification about the event is communicated to a notification application. The request comprises data designating both the urgency level and the impact level. In one aspect the notification application is a personal assistant application running on an end-user device. The notification application is responsible for presenting notifications for multiple applications.

Figure 5:
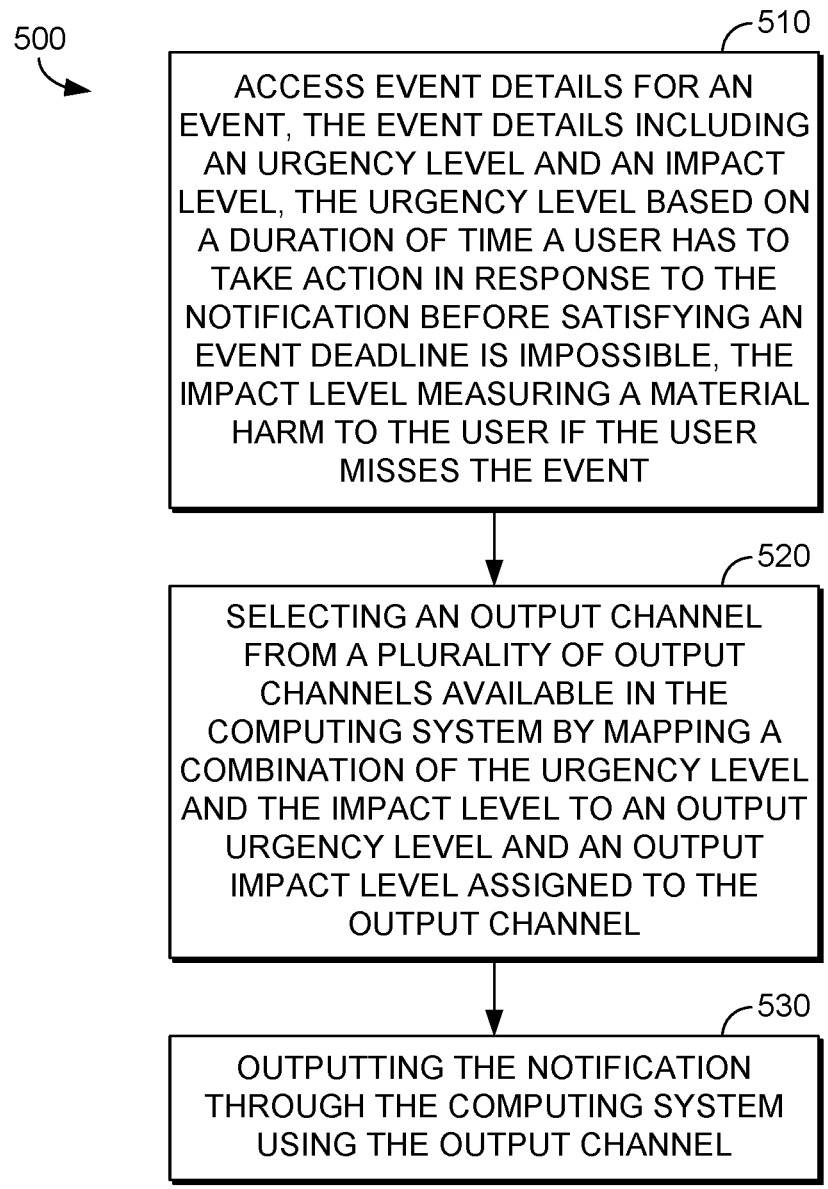
FIG. 5 is a diagram depicting a method of selecting a communication channel for a notification, in accordance with an aspect of the technology described herein.

Turning now to FIG. 5, a method 500 of providing a notification is described, according to an aspect of the present invention.

At step 510 event details for an event are accessed. The event details could be accessed from a notification request, a contextual data store for the user, a semantic data store, or other sources. The event details include an urgency level and an impact level. As explained in detail previously, the urgency level is based on a duration of time a user has to take action in response to the notification before satisfying an event deadline is impossible. The impact level measuring a material harm to the user if the user misses the event. In one aspect, the urgency level could be urgent or not urgent, as explained previously. The impact level could be high, medium, or low as described previously.

At step 520 a communication channel is selected from a plurality of communication channels available in the computing system by mapping a combination of the urgency level and the impact level to an output urgency level and an output impact level assigned to the communication channel. The mapping can occur according the intrusiveness of a communication channel.

In one aspect, each communication channel is associated with an intrusiveness level. Exemplary intrusiveness levels can include a high intrusiveness level, a medium intrusiveness level, and a low intrusiveness level. The communication channel can have only one intrusiveness level, but multiple communication channels can have the same intrusiveness level. For example, multiple communication channels could have a high intrusiveness level. When multiple communication channels of the same intrusiveness level exist, the selection can be based on contextual factors, such as whether or not the user is interacting with the computing device. If the user is not interacting with the computing device, an audible alarm may be selected as an communication channel. On the other hand, if the user is currently interacting with the computing device, then an communication channel that includes only a visual display may be appropriate.

In one aspect, a high intrusiveness level is mapped to a high urgency level and a high impact level event. A medium intrusiveness level is mapped to a low urgency level and a medium impact level or a high urgency level and medium impact level event. A low intrusiveness level is mapped to a low urgency level and a low impact level.

At step 530 the notification is output through the computing system using the communication channel. The notification can be output by interfacing operating system components that control output mechanisms, such as speakers and displays, on an computing device.

Exemplary Operating Environment

Figure 6:
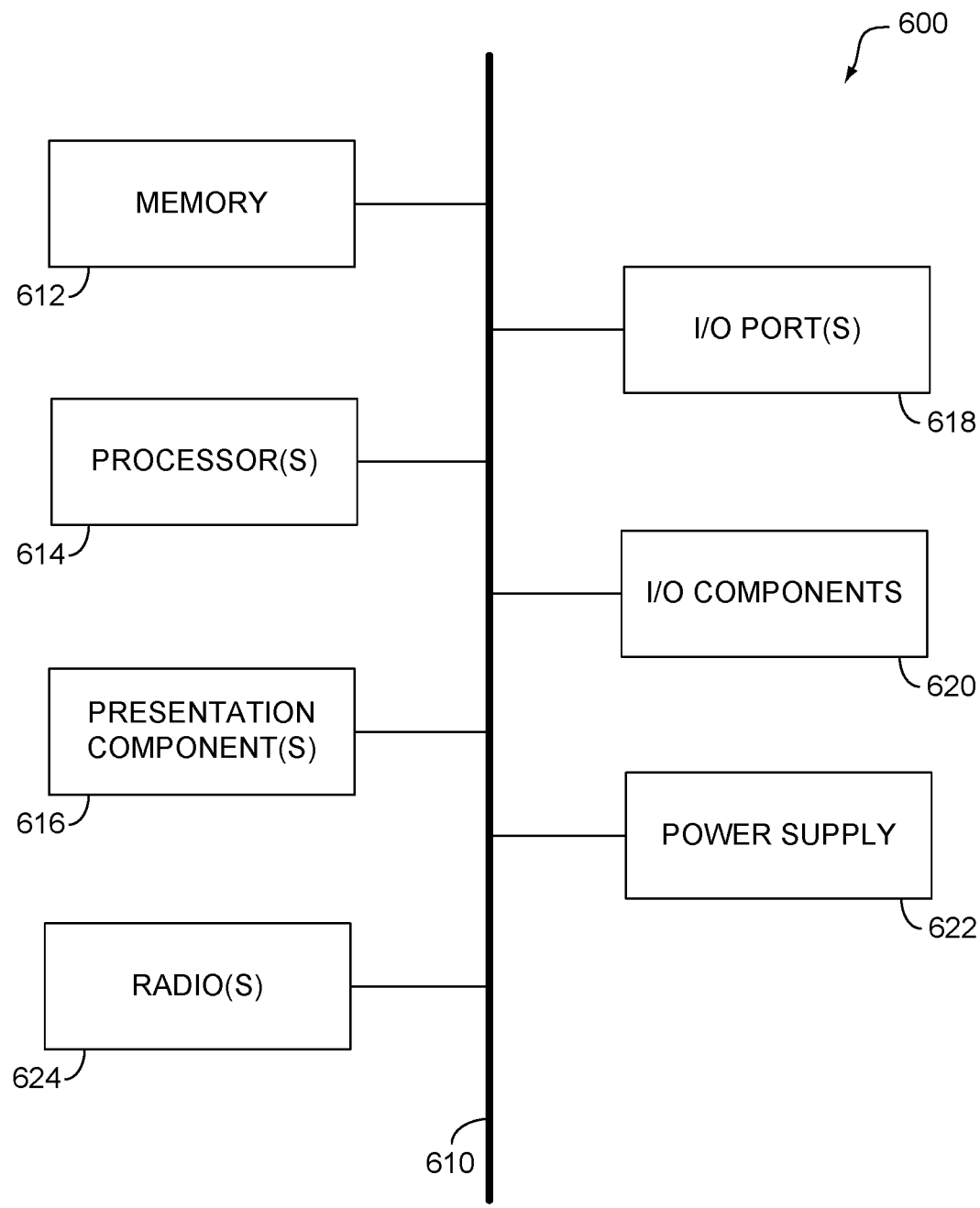
FIG. 6 is a block diagram of an exemplary computing device suitable for implementing aspects of the technology described herein.

Referring to the drawings in general, and initially to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

EMBODIMENTS

Embodiment 1

A computing system comprising: a processor; and computer storage memory having computer-executable instructions stored thereon which, when executed by the processor, configure the computing system to: receive a request to present a notification about an event to a user, the request associated with data designating both an urgency level and an impact level, wherein the urgency level is based on an amount of time between a point in time when the notification is to be presented and an event deadline, and wherein the impact level is based on an amount of material harm that would result from the user missing the event; select an communication channel that is associated with an intrusiveness level mapped to the urgency level and the impact level; and output the notification through the computing system using the communication channel.

Embodiment 2

The system of embodiment 1, wherein the impact level is one of a high impact level, a medium impact level, or a low impact level, and wherein the urgency level is one of a high urgency level or a low urgency level.

Embodiment 3

The system as in any one of the above embodiments, wherein the intrusiveness level is one of a high intrusiveness level, a medium intrusiveness level, or a low intrusiveness level, wherein the high intrusiveness level is mapped to the high urgency level and the high impact level, wherein the medium intrusiveness level is mapped to the low urgency level and the medium impact level, and wherein the low intrusiveness level is mapped to the low urgency level and the low impact level.

Embodiment 4

The system as in any one of the above embodiments, wherein the high impact level is defined by the amount of material harm comprising a loss of money by the user.

Embodiment 5

The system as in any one of the above embodiments, wherein the high impact level is defined by the amount of material harm comprising a loss of time by the user.

Embodiment 6

The system as in any one of the above embodiments, wherein the low intrusiveness level communication channel comprises a visible display that requires user proactivity to access.

Embodiment 7

The system as in any one of the above embodiments, wherein the low impact level is assigned when no user action is required for the event.

Embodiment 8

The system as in any one of the above embodiments, wherein the medium level communication channel comprises a visible display that does not require user proactivity to access.

Embodiment 9

The system as in any one of the above embodiments, wherein the low urgency level is assigned when the amount of time concludes on a first day that is not a second day during which the notification is output.

Embodiment 10

A method of selecting an communication channel for a notification associated with an event, the method comprising: receiving event details for the event associated with the notification; determining an event deadline for the event using the event details; calculating a duration of time between the event deadline and a time when the notification is to be presented; assigning an urgency level to the event based on the duration of time being in a range associated with the urgency level; determining, using a machine classifier, an impact level for the event, the impact level measuring a material harm to the user if the user misses the event; and communicating a request to present a notification about the event to a notification application, the request associated with data designating both the urgency level and the impact level.

Embodiment 11

The method of embodiment 10, wherein the urgency level is high level when the duration of time concludes within a day on which the notification is to be output.

Embodiment 12

The method as in any one of the embodiment 10 or 11, wherein the impact level is a high level when the material harm comprises a loss of time by the user.

Embodiment 13

The method as in any one of the embodiment 10, 11, or 12, wherein the impact level is a high level when the material harm comprises a loss of time by the user.

Embodiment 14

The method as in any one of the embodiment 10, 11, 12, or 13, wherein the impact level is a low level when the event does not require a user action.

Embodiment 15

The method as in any one of the embodiment 10, 11, 12, 13, or 14, wherein the impact level is a medium level when the material harm comprises a loss of efficiency by the user.

Embodiment 16

A method of providing a notification comprising: accessing event details for an event, the event details including an urgency level and an impact level, the urgency level based on a duration of time a user has to take action in response to the notification before satisfying an event deadline is impossible, the impact level measuring a material harm to the user if the user misses the event; selecting an communication channel from a plurality of communication channels available in a computing system by mapping a combination of the urgency level and the impact level to an output urgency level and an output impact level assigned to the communication channel; and outputting the notification through the computing system using the communication channel.

Embodiment 17

The method of embodiment 16, wherein the communication channel comprises an audible alarm when the urgency level is a high urgency level and the impact level is a high impact level.

Embodiment 18

The method as in any one of the embodiment 16 or 17, wherein the high urgency level is assigned when the duration of time concludes within a day on which the notification is output.

Embodiment 19

The method as in any one of the embodiment 16, 17, or 18, wherein the communication channel comprises a visible display that required user proactivity to access when the urgency level is a low urgency level and the impact level is a low impact level.

Embodiment 20

The method of embodiment 19, wherein the low urgency level is assigned when the duration of time concludes on a first day that is not a second day during which the notification is output, and wherein the low impact level is assigned when no material harm will result from missing the event.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising: a processor; and computer storage memory having computer-executable instructions stored thereon which, when executed by the processor, configure the computing system to:
   receive a request to present a notification about an event to a user, the request associated with data designating both an urgency level and an impact level, wherein the urgency level is based on an amount of time between a point in time when the notification is to be presented and an event deadline, and wherein the impact level is based on an amount of material harm that would result from the user missing the event, wherein the impact level is determined based on an amount of money the user may lose if the user misses the event;
   select a communication channel that is associated with an intrusiveness level mapped to the urgency level and the impact level; and
   output the notification through the computing system using the communication channel.

2. The system of claim 1, wherein the impact level is one of a high impact level, a medium impact level, or a low impact level, and wherein the urgency level is one of a high urgency level or a low urgency level.

3. The system of claim 2, wherein the intrusiveness level is one of a high intrusiveness level, a medium intrusiveness level, or a low intrusiveness level, wherein the high intrusiveness level is mapped to the high urgency level and the high impact level, wherein the medium intrusiveness level is mapped to the low urgency level and the medium impact level, and wherein the low intrusiveness level is mapped to the low urgency level and the low impact level.

4. The system of claim 3, wherein the low intrusiveness level communication channel comprises a visible display that requires user proactivity to access.

5. The system of claim 4, wherein the low impact level is assigned when no user action is required for the event.

6. The system of claim 3, wherein the medium intrusiveness level communication channel comprises a visible display that does not require user proactivity to access.

7. The system of claim 6, wherein the low urgency level is assigned when the amount of time concludes on a first day that is not a second day during which the notification is output.

8. The system of claim 2, wherein the impact level is the low impact level when the event does not require a user action.

9. The system of claim 2, wherein the high impact level is also defined by the amount of material harm comprising a loss of time by the user.

10. A method of selecting a communication channel for a notification associated with an event, the method comprising:
    receiving event details for the event associated with the notification;
    determining an event deadline for the event using the event details;
    calculating a duration of time between the event deadline and a time when the notification is to be presented;

assigning an urgency level to the event based on the duration of time being in a range associated with the urgency level;

determining, using a machine classifier, an impact level for the event, the impact level measuring an amount of time lost by the user if the user misses the event; and communicating a request to present a notification about the event to a notification application, the request associated with data designating both the urgency level and the impact level.

11. The method of claim 10, wherein the urgency level is a high impact level when the duration of time concludes within a day on which the notification is to be output.

12. The method of claim 10, wherein the impact level is a high impact level when the material harm comprises a loss of greater than a threshold amount of time by the user.

13. The method of claim 10, wherein the impact level is a low impact level when the material harm comprises a loss of less than a threshold amount of time by the user.

14. The method of claim 10, wherein the impact level is a low impact level when the event does not require a user action.

15. The method of claim 10, wherein the impact level is a medium impact level when the material harm comprises a loss of efficiency by the user.

16. A method of providing a notification comprising:

accessing event details for an event, the event details including an urgency level and an impact level, the urgency level based on a duration of time a user has to take action in response to the notification before satisfying an event deadline is impossible, the impact level measuring an amount of time lost by the user if the user misses the event;

selecting a communication channel from a plurality of communication channels available in a computing system by mapping a combination of the urgency level and the impact level to an output urgency level and an output impact level assigned to the communication channel; and outputting the notification through the computing system using the communication channel.

17. The method of claim 16, wherein the communication channel comprises an audible alarm when the urgency level is a high urgency level and the impact level is a high impact level.

18. The method of claim 17, wherein the high urgency level is assigned when the duration of time concludes within a day on which the notification is output.

19. The method of claim 16, wherein the communication channel comprises a visible display that required user proactivity to access when the urgency level is a low urgency level and the impact level is a low impact level.

20. The method of claim 19, wherein the low urgency level is assigned when the duration of time concludes on a first day that is not a second day during which the notification is output, and wherein the low impact level is assigned when no material harm will result from missing the event.

* * * * *